(12) United States Patent
D'Amato et al.

(10) Patent No.: US 10,486,681 B2
(45) Date of Patent: Nov. 26, 2019

(54) METHOD AND SYSTEM FOR TORQUE MANAGEMENT IN HYBRID VEHICLE

(71) Applicant: Ford Global Technologies, LLC, Dearborn, MI (US)

(72) Inventors: Anthony Mario D'Amato, Canton, MI (US); Karin Lovett, Novi, MI (US); Mark Warren Muddiman, Belleville, MI (US); John Jeffrey Pfeiffer, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 15/406,571

(22) Filed: Jan. 13, 2017

(65) Prior Publication Data

US 2018/0201250 A1 Jul. 19, 2018

(51) Int. Cl.
| | |
|---|---|
| *B60W 20/12* | (2016.01) |
| *B60W 20/13* | (2016.01) |
| *B60W 10/06* | (2006.01) |
| *B60W 10/08* | (2006.01) |
| *B60W 30/188* | (2012.01) |
| *B60W 50/00* | (2006.01) |
| *B60K 6/20* | (2007.10) |

(52) U.S. Cl.
CPC ............ *B60W 20/12* (2016.01); *B60W 10/06* (2013.01); *B60W 10/08* (2013.01); *B60W 20/13* (2016.01); *B60W 30/188* (2013.01); *B60W 50/0098* (2013.01); *B60K 6/20* (2013.01); *B60W 2050/0031* (2013.01); *B60W 2510/0657* (2013.01); *B60W 2510/083* (2013.01); *B60W 2510/18* (2013.01); *B60W 2510/244* (2013.01); *B60W 2520/10* (2013.01); *B60W 2530/10* (2013.01); *B60W 2550/14* (2013.01); *B60W 2550/402* (2013.01); *B60W 2560/02* (2013.01); *B60W 2710/0666* (2013.01); *B60W 2710/083* (2013.01); *B60Y 2200/92* (2013.01); *B60Y 2300/188* (2013.01); *B60Y 2300/43* (2013.01); *B60Y 2300/60* (2013.01); *Y02T 10/6286* (2013.01); *Y02T 10/7077* (2013.01); *Y10S 903/93* (2013.01)

(58) Field of Classification Search
CPC combination set(s) only.
See application file for complete search history.

(56) References Cited

U.S. PATENT DOCUMENTS

| | | | |
|---|---|---|---|
| 2002/0139360 A1* | 10/2002 | Sato | F02D 41/0037 123/698 |
| 2009/0204280 A1 | 8/2009 | Simon, Jr. et al. | |
| 2009/0312145 A1* | 12/2009 | Pohl | F16H 15/50 477/37 |
| 2010/0049414 A1* | 2/2010 | Ohtomo | B60L 3/08 701/70 |

(Continued)

FOREIGN PATENT DOCUMENTS

WO WO-2014177786 A1 * 11/2014 ........ B60W 50/0097

*Primary Examiner* — Redhwan K Mawari
(74) *Attorney, Agent, or Firm* — Geoffrey Brumbaugh; McCoy Russell LLP

(57) ABSTRACT

Methods and systems are provided for managing torque arbitration for a hybrid powertrain. In one example, a method may include operating the hybrid powertrain over a predetermined route with a torque arbitration, and updating the torque arbitration based on a vehicle mass.

20 Claims, 5 Drawing Sheets

(56) References Cited

U.S. PATENT DOCUMENTS

| | | | |
|---|---|---|---|
| 2010/0093480 A1* | 4/2010 | Pohl | F02B 67/04 475/214 |
| 2011/0093146 A1* | 4/2011 | Falkenstein | B60W 10/02 701/22 |
| 2011/0130904 A1 | 6/2011 | McGrogan et al. | |
| 2012/0239562 A1* | 9/2012 | Rich | G06Q 20/145 705/40 |
| 2013/0001006 A1* | 1/2013 | Gibson | B62D 5/0481 180/446 |
| 2013/0179007 A1* | 7/2013 | Dalum | H01M 16/006 701/2 |
| 2013/0261874 A1* | 10/2013 | McQuade | F02D 29/02 701/29.1 |
| 2013/0296124 A1* | 11/2013 | Pietron | B60W 20/40 477/5 |
| 2013/0296126 A1* | 11/2013 | Gibson | F02N 11/006 477/5 |
| 2013/0296132 A1* | 11/2013 | Doering | B60K 6/48 477/86 |
| 2013/0297122 A1* | 11/2013 | Gibson | B60W 20/40 701/22 |
| 2014/0257669 A1* | 9/2014 | Wu | B60W 10/06 701/102 |
| 2014/0277835 A1* | 9/2014 | Filev | G01C 21/3469 701/2 |
| 2014/0342865 A1* | 11/2014 | Hayashi | B60K 6/365 475/5 |
| 2015/0019056 A1* | 1/2015 | Heck | B60W 10/06 701/22 |
| 2016/0009269 A1 | 1/2016 | Zhou et al. | |
| 2016/0046278 A1* | 2/2016 | Matsuzaki | B60W 10/10 701/22 |
| 2016/0159340 A1* | 6/2016 | Chung | B60W 20/17 701/22 |
| 2016/0167640 A1* | 6/2016 | Zettel | B60W 10/26 701/22 |
| 2016/0230648 A1* | 8/2016 | Sanchez Perez | F02B 37/10 |
| 2016/0290265 A1* | 10/2016 | Gabriel | F02D 41/021 |
| 2016/0303979 A1* | 10/2016 | Heyse | B60L 1/02 |
| 2017/0045102 A1* | 2/2017 | Eppler | F16D 48/06 |
| 2017/0175564 A1* | 6/2017 | Schlak | F01D 15/10 |
| 2018/0201250 A1* | 7/2018 | D'Amato | B60W 20/12 |

\* cited by examiner

METHOD AND SYSTEM FOR TORQUE MANAGEMENT IN HYBRID VEHICLE

FIELD

The present description relates generally to methods and systems for controlling a vehicle to determining a torque arbitration between an engine and an electric machine.

BACKGROUND/SUMMARY

A hybrid powertrain may be powered by a combination of an engine and an electric machine, such as an electric motor. The electric machine may improve drivability by compensating for the fluctuation in the engine torque output during transmission shifts. The hybrid powertrain may further include an energy storage module to power the electric machine. In order to efficiently utilize the onboard fuel and energy stored in the energy storage module, a vehicle torque demand may be distributed (or arbitrated) strategically among the engine and the electric machine.

Attempts to address torque arbitration include arbitrating the torque based on engine characteristics. One example approach is shown by Simon, J R. et al. in U.S. US2009/0204280. Therein, the torque request to an engine and a motor is controlled by a predetermined calibration based on the capabilities of the engine and the motor.

However, the inventors herein have recognized potential issues with such systems. As one example, when operating the vehicle on a predetermined route, such as in a race, vehicle weight may affect vehicle performance. For example, low vehicle weight is preferred to maximize vehicle propulsion. The vehicle weight may be reduced by arbitrating a high level of engine torque to increase the consumption of the onboard fuel. Further, burning excess fuel during regenerative braking can recharge the energy storage module and extend the range of the electric assist from the electric machine. Ideally, the depletion of the energy in the energy storage device and the onboard fuel may be coincident with the end of the race. Depleting the battery before the end of the race may result in additional battery weight with no power benefit. Depleting the onboard fuel early in the race may result in loss of electric assist and reduced torque output.

In one example, the issues described above may be addressed by a method comprising operating a hybrid powertrain to provide a torque to vehicle wheels over a predetermined drive route; and arbitrating the torque between an engine and an electric machine based on a vehicle mass. In this way, the highest power to weight ratio on average over a predetermined route may be achieved.

As one example, an optimal torque arbitration among the engine and the electric machine may be determined by optimizing a cost function constructed based on a vehicle model. As an example, the torque arbitration may be optimized to achieve a maximum vehicle speed. As another example, the torque arbitration may be optimized to achieve an optimal velocity profile. The vehicle model may include multiple functions for calculating a vehicle acceleration based on inputs including an amount of onboard fuel. By including the amount of onboard fuel into the vehicle model, the effect of vehicle mass variation during the race is accounted for when solving the optimization problem for the optimal torque arbitration. Parameters of the vehicle model (that is, coefficients and formats of the multiple functions of the vehicle model) may be updated at the end of each race based on track data acquired during the race and previous races as well as previous non-racing vehicle operation. The track data may include an engine torque output, an electric motor torque output, a vehicle speed, a battery state of charge, and an onboard fuel amount at each location during the track. By updating the vehicle model, mechanical and environmental changes of the vehicle system are accounted for in the determination of the optimal torque arbitration. For example, the mechanical change may include wearing or adjustment of the vehicle's mechanical system; and the environmental change may include variation in weather and road condition.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
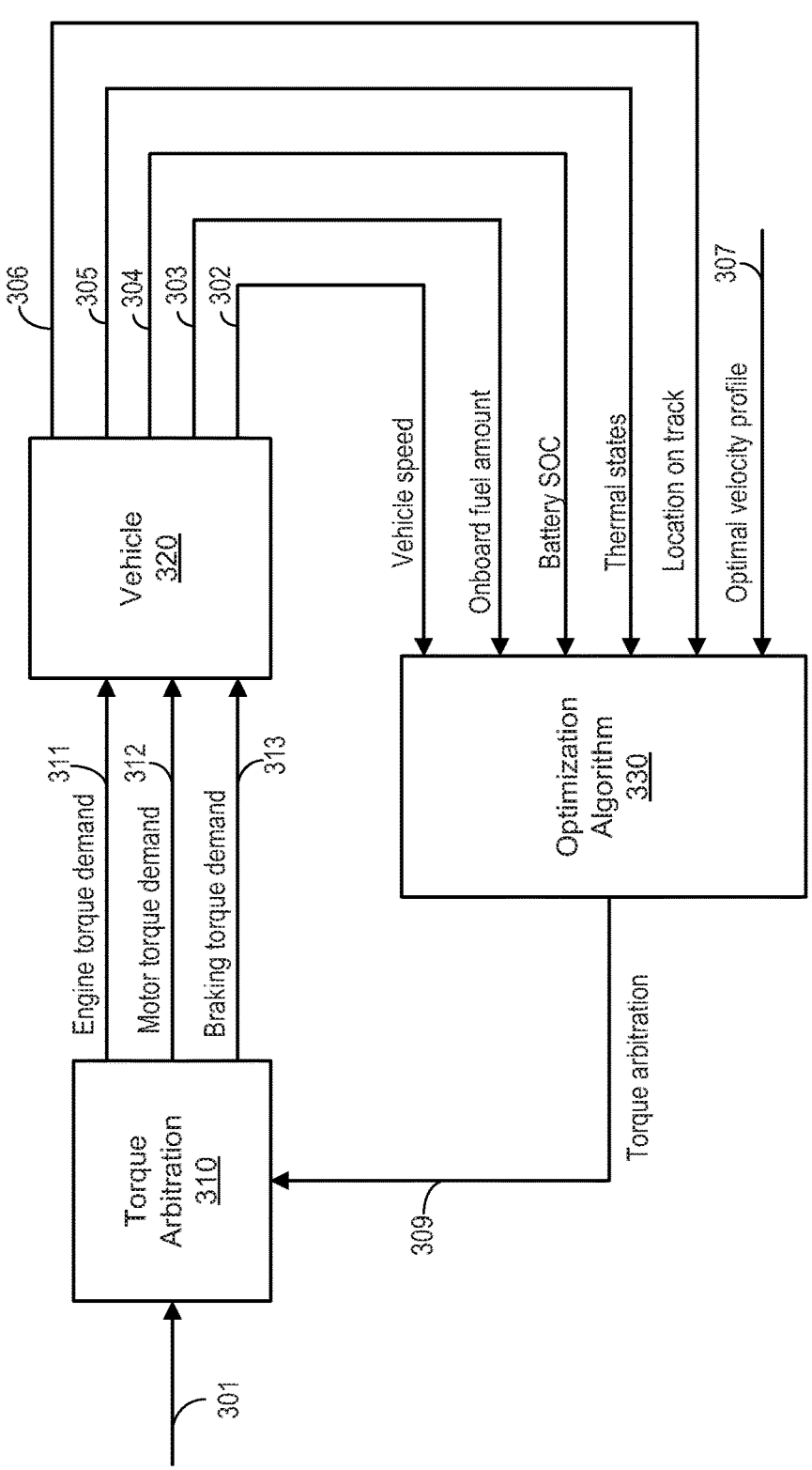
FIG. 3 shows a block diagram for torque arbitration optimization.
Figure 4:
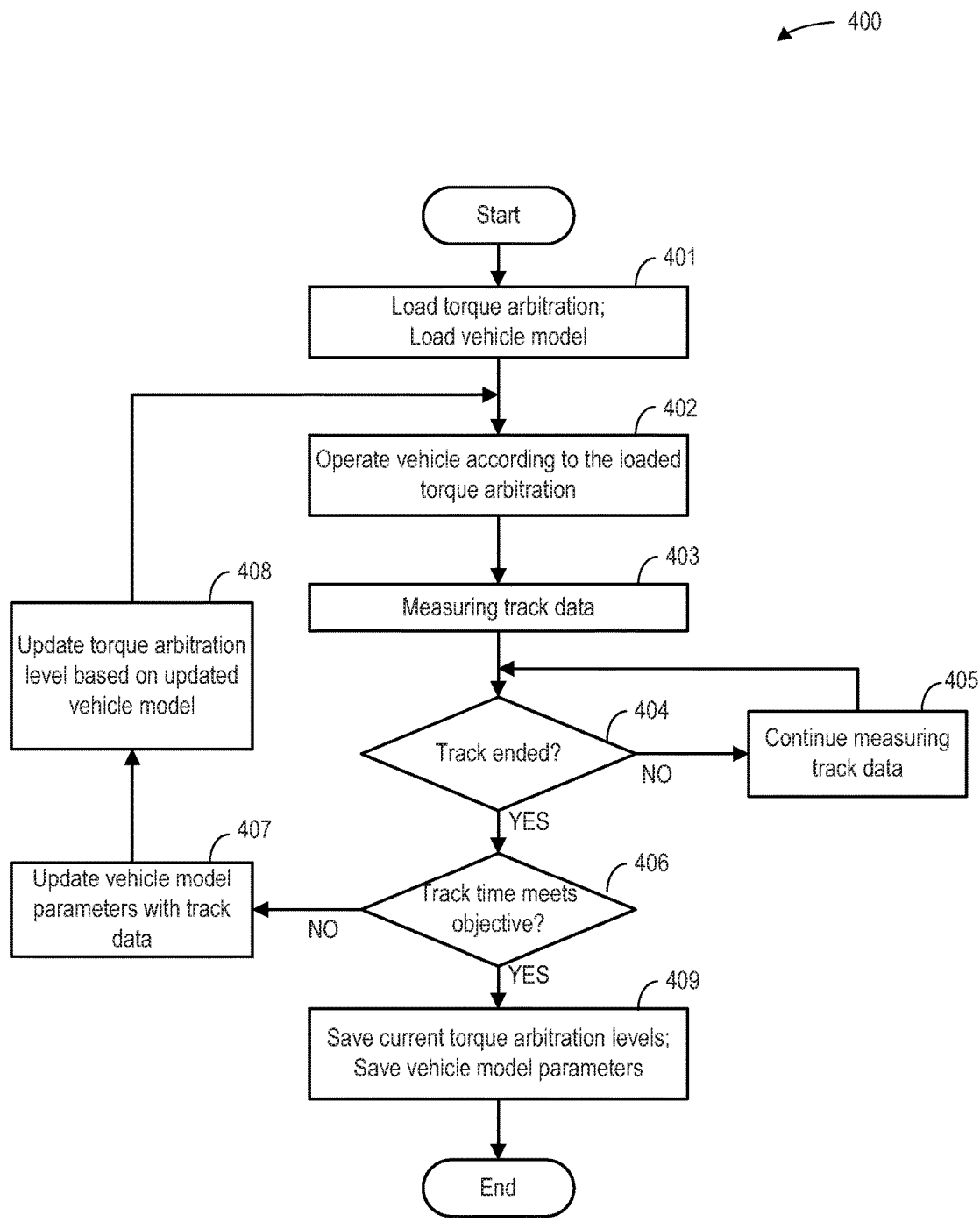
FIG. 4 shows an example method of managing the torque arbitration of the hybrid powertrain of FIG. 1.
Figure 5:
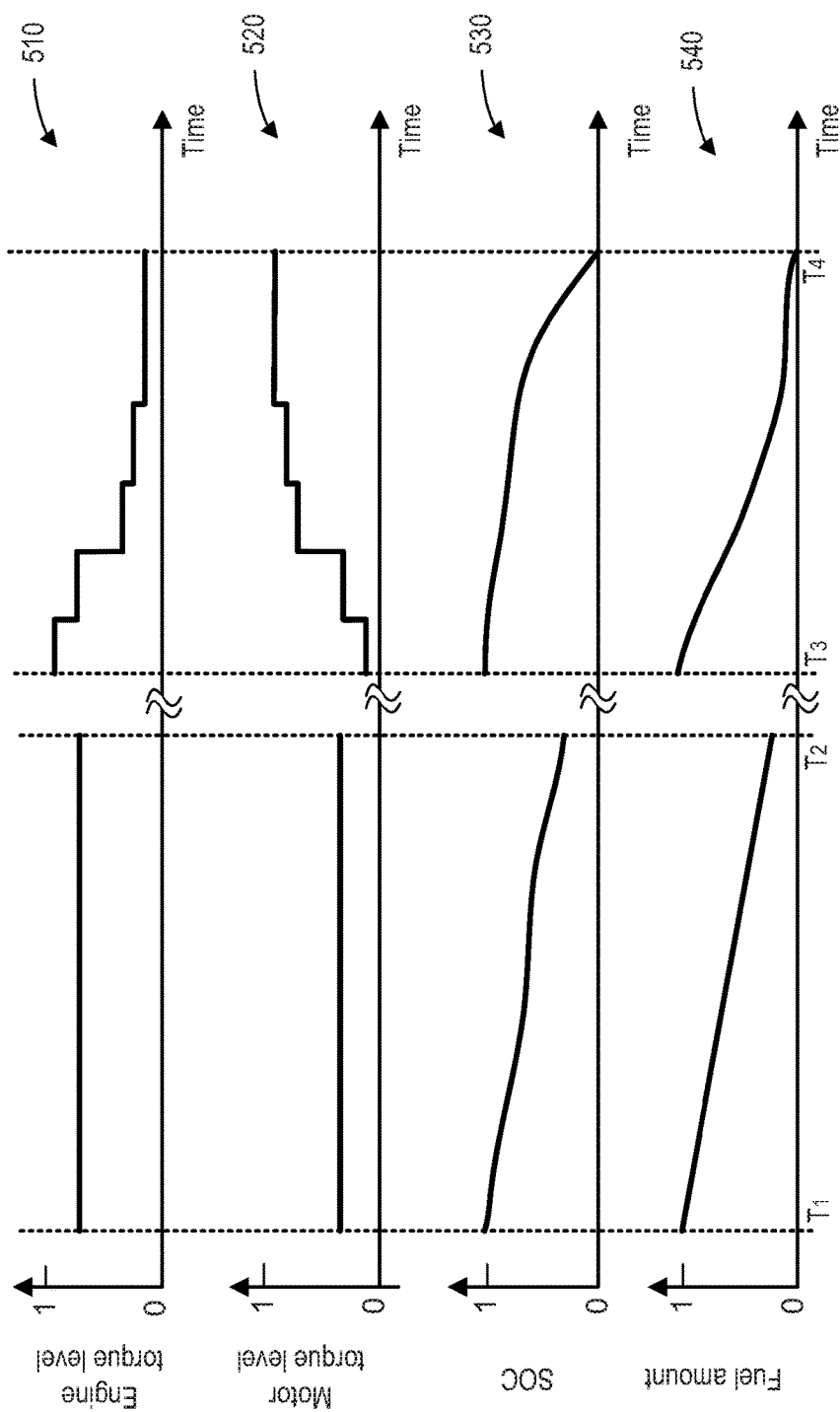
FIG. 5 illustrate timelines of torque arbitration and example vehicle parameters while implementing the method of FIG. 4.

The following description relates to systems and methods for managing torque arbitration between an engine and an electric machine (such as an electric motor) on a predetermined route in a hybrid powertrain. An example hybrid powertrain is presented in FIG. 1. The powertrain may include an internal combustion engine shown in FIG. 2. The torque distribution may be arbitrated with torque arbitration levels generated through an optimization algorithm. FIG. 3 shows a block diagram for torque arbitration optimization. The torque arbitration levels are optimized based on track data acquired while operating the vehicle on the predetermined route. The driver demand may be updated by the optimized torque arbitration levels to reduce the travel time on the predetermined route. FIG. 4 shows an example method of iteratively optimizing the torque arbitration based a vehicle model. The vehicle model may be updated by the track data during each iteration. Timelines of the torque arbitration levels and selected vehicle parameters during implementing the method of FIG. 4 are illustrated in FIG. 5.

Figure 1:
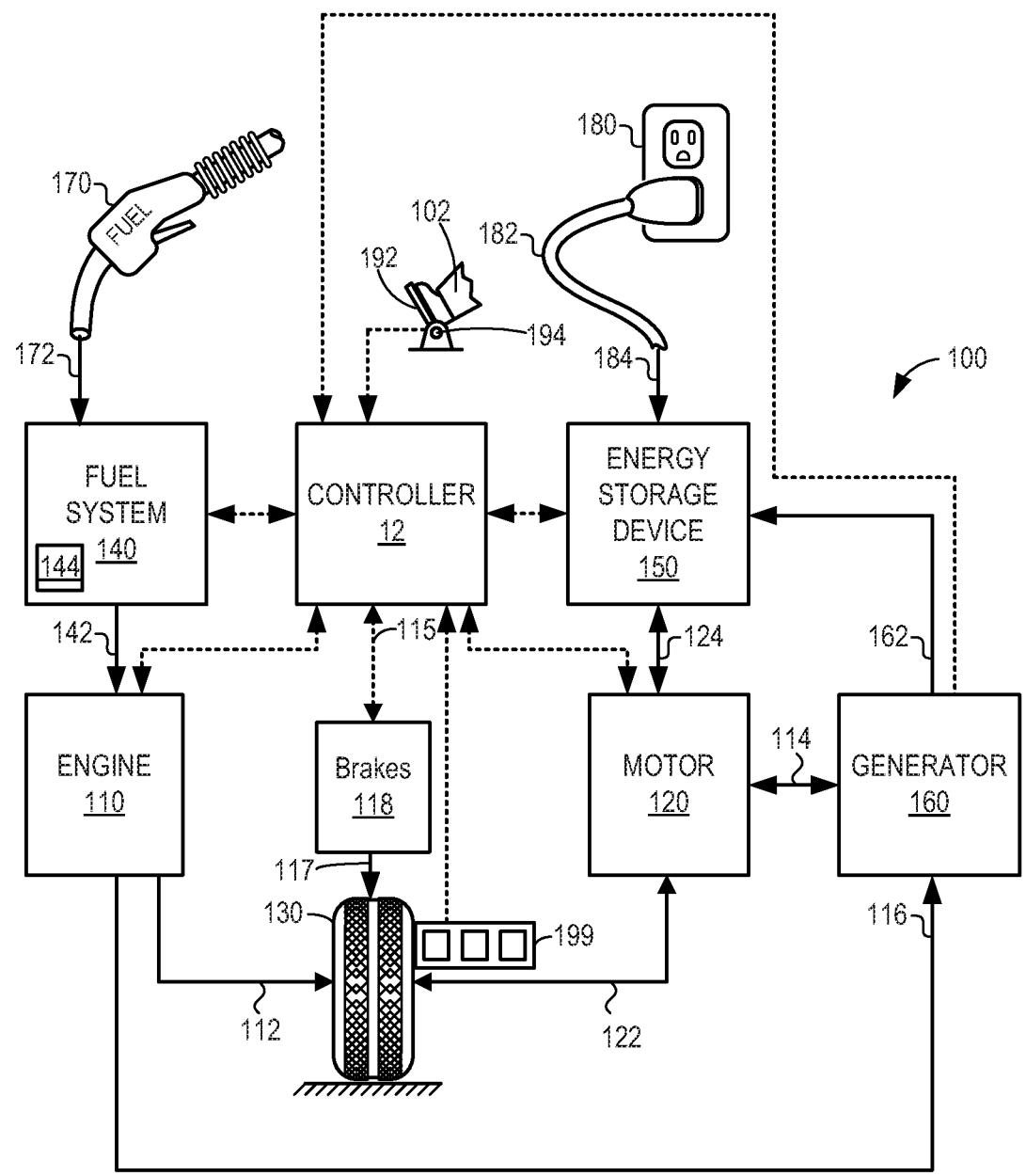
FIG. 1 shows an example hybrid powertrain.

FIG. 1 illustrates an example hybrid powertrain 100. The hybrid powertrain 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

The hybrid powertrain 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, the hybrid powertrain 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Controller 12 may communicate with one or more of engine 110, motor 120, fuel system 140, energy storage device 150, and generator 160. Controller 12 may receive sensory feedback information from one or more of engine 110, motor 120, fuel system 140, energy storage device 150, and generator 160. Further, controller may send control signals to one or more of engine 110, motor 120, fuel system 140, energy storage device 150, and generator 160 responsive to this sensory feedback. Controller 12 may receive an indication of an operator requested output of the vehicle propulsion system from a vehicle operator 102. For example, controller may receive sensory feedback from pedal position sensor 194 which communicates with pedal 192. Pedal 192 may refer schematically to a brake pedal and/or an accelerator pedal. The configuration of controller 12 is further elaborated in FIG. 2.

Friction brakes 118 may be coupled to wheel 130. A frictional force may be applied to wheel 130 by engaging wheel brakes 118 as indicated by arrow 117. In one example, wheel brakes 118 may be engaged in response to the driver pressing his foot on a brake pedal 192. In other examples, controller 12 or a controller linked to controller 12 may apply or engage wheel brakes. In the same way, a frictional force may be reduced to wheels 130 by disengaging wheel brakes 118 in response to the driver releasing his foot from a brake pedal.

Energy storage device 150 may periodically receive electrical energy from a power source 180 residing external to the vehicle (e.g., not part of the vehicle) as indicated by arrow 184. As a non-limiting example, the hybrid powertrain 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Controller 12 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, the hybrid powertrain 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, controller may receive an indication of the amount of on board fuel stored at fuel tank 144 via a fuel level sensor. The level of fuel stored at fuel tank 144 (e.g., as identified by the fuel level sensor) may be communicated to the vehicle operator, for example, via a fuel gauge.

In an alternative embodiment, sensor(s) 199 may be coupled to the hybrid powertrain 100 for measuring vehicle conditions including vehicle speed and vehicle location. Sensor 199 may be connected to controller 12.

The controller 12 receives signals from the various sensors of FIG. 1 and employs the various actuators of FIG. 1 to adjust engine operation based on the received signals and instructions stored on a memory of the controller. For example, adjusting the engine torque may include adjusting an actuator of the fuel system to adjust an amount of fuel injected into the engine cylinder. The amount of fuel injected into the engine cylinder may be controlled by adjusting the pulse width of a signal sending to a fuel injector. Details of the fuel injector is presented in FIG. 2. As another example, adjusting the electric motor torque may include adjusting the current and voltage output of the energy storage device to adjusting the torque output of the electric motor. As another example, adjusting the braking torque may include adjusting the actuator within brakes 118 in order to adjust the friction force applied to wheel.

Figure 2:
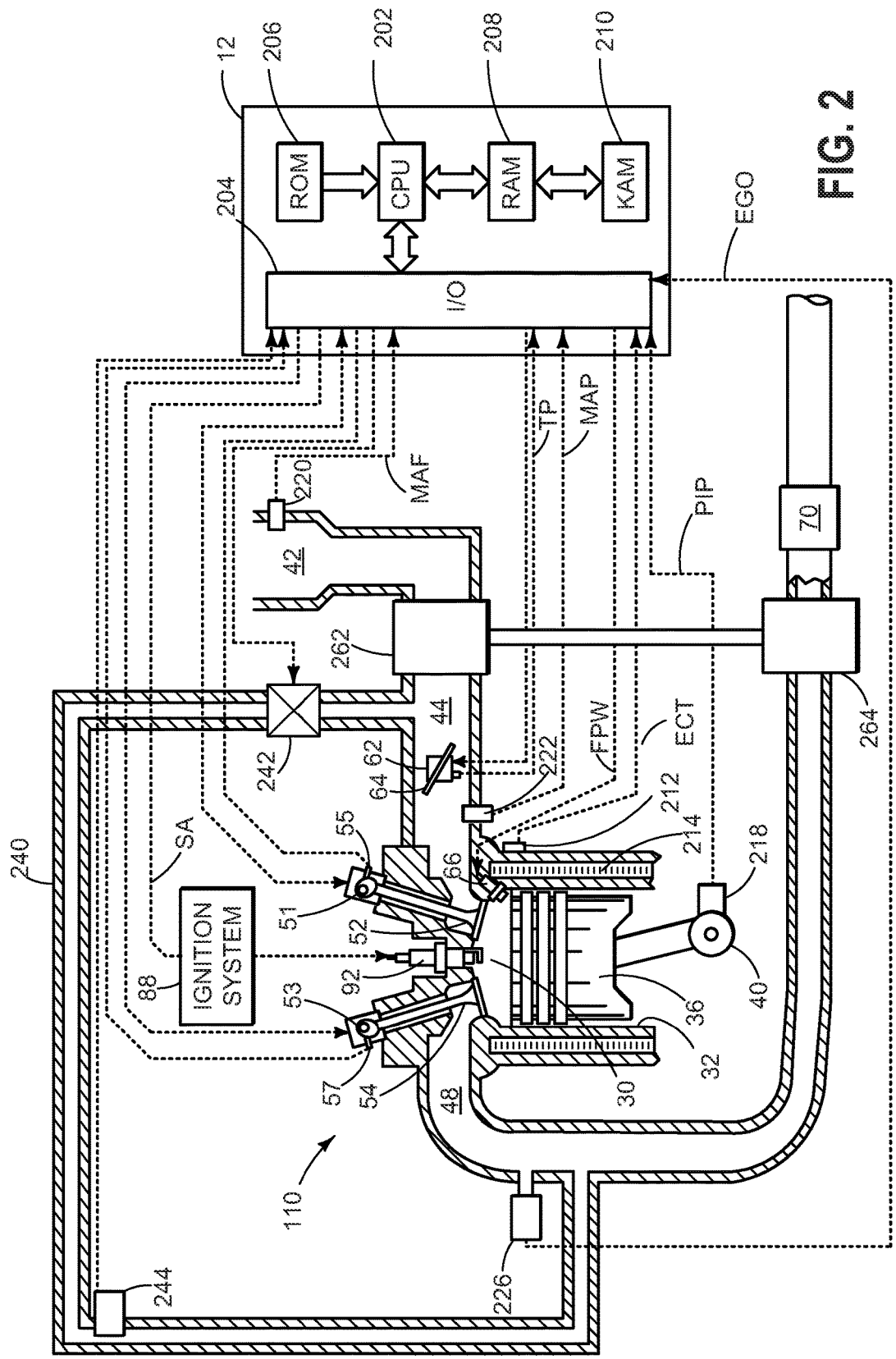
FIG. 2 shows an example internal combustion engine of the hybrid powertrain of FIG. 1.

Turning now to FIG. 2, a schematic diagram illustrates one cylinder of a multi-cylinder engine 110. Engine 110 may be controlled at least partially by controller 12. Combustion chamber (i.e., cylinder) 30 of engine 110 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of the vehicle (such as wheel 130 of FIG. 1). Further, a starter motor may be coupled to crankshaft 40 via a flywheel to enable a starting operation of engine 110.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively.

Fuel injector 66 is shown coupled directly to combustion chamber 30 for injecting fuel directly therein in proportion to the pulse width of signal FPW received from controller 12. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (such as fuel system 140 of FIG. 1).

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 220 and a manifold air pressure sensor 222 for providing respective signals MAF and MAP to controller 12.

Further, in the disclosed embodiments, an exhaust gas recirculation (EGR) system may route a desired portion of exhaust gas from exhaust passage 48 to intake manifold 44. In this example, high pressure (HP) EGR passage 240 is illustrated. The amount of EGR provided to intake manifold 44 may be varied by controller 12 via HP EGR valve 242. Further, an EGR sensor 244 may be arranged within the HP EGR passage 240 and may provide an indication of one or more of pressure, temperature, and concentration of the exhaust gas.

As such, engine 110 may further include a compression device such as a turbocharger or supercharger including at least a compressor 262 arranged along intake manifold 44. For a turbocharger, compressor 262 may be at least partially driven by a turbine 264 (e.g., via a shaft) arranged along exhaust passage 48. For a supercharger, compressor 262 may be at least partially driven by the engine 110 and/or an electric machine, and may not include a turbine. Thus, the amount of compression provided to one or more cylinders of the engine via a turbocharger or supercharger may be varied by controller 12.

Exhaust gas sensor 226 is shown coupled to exhaust passage 48 upstream of emission control device 70. Exhaust gas sensor 226 may be any suitable sensor for providing an indication of exhaust gas air/fuel ratio. The emission control device 70 may include a three-way catalyst a particulate filter.

Controller 12 is shown in FIG. 2 as a microcomputer, including microprocessor 202, input/output ports 204, an electronic storage medium (e.g., computer-readable) for executable programs and calibration values shown as read-only memory 206 in this particular example, random access memory 208, keep alive memory 210, and a data bus. Controller 12 may receive various signals from sensors coupled to engine 110, in addition to those signals previously discussed, including measurement of inducted mass airflow (MAF) from mass airflow sensor 220; engine coolant temperature (ECT) from temperature sensor 212 coupled to cooling sleeve 214; a profile ignition pickup signal (PIP) from Hall effect sensor 218 (or other type) coupled to crankshaft 40; throttle position (TP), or throttle opening, from a throttle position sensor; and absolute manifold pressure signal, MAP, from sensor 222. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft.

Storage medium read-only memory 106 can be programmed with computer readable data representing instructions executable by microprocessor 202 for performing the methods described herein, as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

FIG. 3 shows a block diagram for optimizing the torque arbitration. A driver demanded torque was modified by the output of an optimization algorithm with the goal of reducing the race time. The vehicle is controlled by the modified driver demanded torque. Vehicle operating parameters, herein also being referred as track data, are recorded and used for optimizing the torque arbitration.

The driver demanded torque 301 is sent to a torque arbitration module 310. The torque arbitration module modifies the driver demanded torque 301 based on the torque arbitration 309 generated from optimization algorithm 330. In one embodiment, the driver demand is the total torque output of the vehicle for propulsion. The driver demanded torque may be a mathematical function of the depression of the acceleration pedal. For example, the driver demanded torque 301 may be proportional to a degree of the depression of the acceleration pedal, measured by a pedal position sensor (such as pedal position sensor 194 of FIG. 1). The torque arbitration module 310 may distribute the driver demanded torque between the engine and electric motor based on the torque arbitration 309. The torque arbitration may include an engine torque level and an electric motor torque level. The torque levels ranges from zero to one. The summation of the torque arbitration levels equals to one. For example, the engine torque level may be 70% and the electric motor torque level may be 30%. The torque arbitration module may calculate an engine torque demand 311 by multiplying the driver demanded torque 301 by the engine torque level, and calculate a motor torque demand 312 by multiplying the driver demanded torque 301 by the electric motor torque level.

In another embodiment, the driver demanded torque 301 may include a total torque demand for vehicle propulsion and a baseline torque arbitration. The baseline torque arbitration may be determined based on look-up tables related to current vehicle state. When optimization is desired, the torque arbitration module may modify the baseline torque arbitration based on the torque arbitration 309 generated from the optimization algorithm 330.

In yet another embodiment, the driver demanded torque 301 may include a total torque demand for vehicle propulsion and a driver demanded braking torque. The driver demanded braking torque may be negative. The driver demanded braking torque may be a mathematical function of the depression of a brake pedal. In an example, in events where actuation lag is a concern, the torque arbitration module 310 may directly transfer the driver demanded braking torque to the friction brake of vehicle 320 (such as brakes 118 of FIG. 1) without modification. In another example, the torque arbitration module 310 may arbitrate a negative driver demanded braking torque between regenerative braking, engine braking, and/or friction braking (313) based on the torque arbitration 309.

Vehicle 320 may be operated based on the engine torque demand 311, motor torque demand 312, and braking torque demand 313. As an example, parameters such as an amount of fuel, an amount of air charge, a spark plug timing may be determined based on the engine torque demand 311 for outputting the demanded engine torque. The current and voltage output of the energy storage device may be determined based on the motor torque demand 311, such that the electric motor may generate the demanded motor torque. The friction force exerted on the vehicle wheel may be determined based on the braking torque demand. While operating the vehicle, vehicle parameters (also referred to as track data) including current vehicle speed 302, onboard fuel amount 303, battery state of charge 304, vehicle thermal states 305, and vehicle location on the track are measured and feedback to the optimization algorithm 330. The vehicle thermal states 305 may include an engine temperature, an electric motor temperature, and a friction brake temperature. The vehicle location on the track may be in three dimensions. The vehicle thermal states may be measured or estimated by respective temperature sensors included in the hybrid powertrain.

The optimization algorithm 330 determines the optimal torque arbitration levels based on the track data measured/ estimated from the vehicle system 320. The optimization algorithm may also take an anticipated speed at the vehicle location as input for determining the engine/electric motor power split. As an example, the optimization algorithm may search for the torque arbitration levels that can minimize a cost function. In one embodiment, the cost function may be constructed with a goal to achieve the anticipated speed at a track location. In another embodiment, the cost function may be constructed with a goal to achieve a minimal track time. The torque arbitration levels may be limited by thermal constraints such as limits on engine temperature, the electric motor temperature, and the friction brake temperature. Detail of the optimization algorithm is elaborated in the description of FIG. 4.

FIG. 4 shows method 400 for torque management in hybrid powertrain, such as hybrid powertrain 100 of FIG. 1. Instructions for carrying out method 400 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 401, the controller loads torque arbitration of the race track stored in the memory of the controller. As an example, the vehicle driver may input the race track identification number, and the controller searches and loads the corresponding torque arbitration from the memory. The stored torque arbitration may be pre-determined levels stored in the memory, or results from previous optimization. The torque arbitration may include the percentage torque level of the engine and an electric machine, such as an electric motor.

The controller may also load a vehicle model. For example, the vehicle model may be a mathematical function between the vehicle acceleration and the demanded torque for the engine, the electric machine, and the brakes. The vehicle model may be in the form of:

$$a(d)=f_1(T_e, T_{ICE}, T_B, V(d), M_V(d)) \quad \text{Equation 1}$$

where d is the vehicle location on the track, the vehicle location may be in three dimensions; a(d) is vehicle acceleration; V(d) is the vehicle velocity; $M_V(d)$ is the vehicle mass; $T_e$ is the electric machine torque, and a negative $T_e$ is regenerative braking; $T_{ICE}$ is the engine torque; and $T_B$ is the braking torque provided by the friction bricks. The vehicle mass may be a function of an amount of onboard fuel:

$$M_V(d)=f_2(F_{QTY}(d)), \quad \text{Equation 2}$$

wherein $F_{QTY}(d)$ is the amount of onboard fuel remaining on the vehicle. The onboard fuel amount may be a function of the engine torque $T_{ICE}$:

$$F_{QTY}(d)=f_3(T_{ICE}, d). \quad \text{Equation 3}$$

The engine torque $T_{ICE}$ may be a function of the engine torque demand $u_1(d)$ (such as engine torque demand 311 of FIG. 3):

$$T_{ICE}(d)=G_1(s)u_1(d), \quad \text{Equation 4}$$

wherein $G_1(s)$ is a transfer function, and s denotes Laplace transform. The transfer function may model engine lag including turbocharger lag and the delays of the engine actuators. The electric motor torque $T_e$ may be a function of the electric motor torque demand $u_2$ (d) (such as electric motor torque demand 312 of FIG. 3):

$$T_e(d)=G_2(s)u_2(d), \quad \text{Equation 5}$$

where $G_2$ (s) is the transfer function from electric motor torque demand $u_2$ (d) to the actual output of motor torque $T_e$. The transfer function $G_2$ (s) may account for delay of switching the motor power source between the energy storage device and the generator. The transfer function $G_2$ (s) may also account for delay in the electric motor response, such as delay from receiving the electric motor demand to outputting the demanded motor torque. The braking torque provided by the braking system $T_B$ may equal to the brake torque demand (such as brake torque demand 313 of FIG. 3), or the driver demanded braking torque:

$$T_B(d)=u_3(d). \quad \text{Equation 6}$$

By loading the vehicle model, parameters of functions $f_1( )-f_3( )$ and transfer functions $G_1(s)-G_2(s)$ are loaded. In this way, the controller may calculate vehicle acceleration at a location based on inputs including the engine torque demand, the electric motor torque demand, the braking torque demand, and the vehicle speed.

At 402, the vehicle is operated based on the loaded torque arbitration. For example, the torque arbitration module (such as torque arbitration module 310 of FIG. 3) calculates the engine torque demand, the electric motor torque demand, and the braking torque demand based on the driver demand and the loaded torque arbitration levels from 401. As an example, the engine torque demand is calculated by multiplying the driver demanded propulsion torque with the engine torque level; the electric motor torque demand is calculated by multiplying the driver demanded propulsion torque with the electric motor torque level; the braking torque demand equals to the driver demanded braking torque. The driver demanded propulsion torque may be determined by checking a lookup table with a degree of acceleration pedal depression.

At 403, method 400 measures track data while operating the vehicle on the race track. The track data are measured or estimated at each location along the track. The track data may include vehicle speed V, amount of onboard fuel $F_{QTY}$, vehicle acceleration a, the engine torque $T_{ICE}$, electric motor torque $T_E$, and braking torque $T_B$. For example, method 400 may measure engine speed and engine load, and estimate the engine torque output by multiplying the measured engine speed with the measured engine load. Method 400 may measure a speed and load of the electric motor, and estimate the actual electric motor torque output by multiplying the measured electric motor speed with the measured electric motor load. Method 400 may measure a braking force, and calculate the braking torque as a function of the braking force. Alternatively, one or more of the engine torque, electric motor torque, and the braking torque may be measured directly with a dynamometer. The track data may further include thermal status including engine temperature, electric motor temperature, and the braking temperature. For example, the engine temperature may be estimated based on the coolant temperature measured by a sensor coupled to the coolant system (such as temperature sensor 212 of FIG. 2). The electric motor temperature and the braking temperature may be measured by temperature sensor coupled to the motor and the brakes, respectively.

At 404, method 400 determines if the race track is end. If the vehicle does not finish the race track, method 300 continues measuring/estimating the track data at 405. If the vehicle finishes the race track, method 400 moves to 406.

At 406, method 400 whether the track time meet the objective. If the track time meets the objective, method 400 saves current torque arbitration levels and current vehicle model to the memory at 409. For example, parameters of current vehicle model may be saved to the memory. If the track time is longer than the objective, method 400 moves to 407.

At 407, the vehicle model is updated based on the track data acquired at 403. In one embodiment, the parameters of the vehicle model may be updated based on the track data. The parameters of the vehicle model may include coefficients and formats of function $f_1( )-f_3( )$ and transfer functions $G_1(s)-G_2(s)$. The parameters of the functions may be determined based on the measured or estimated inputs and outputs. For example, parameters of transfer function $G_1$ may be updated based on the measured or estimated engine torque demand $u_1$ and engine torque $T_{ICE}$ at 403. As another example, parameters of function $f_3( )$ may be updated based on the measured or estimated onboard fuel amount $F_{QTY}$ and engine torque $T_{ICE}$ at 403. In another embodiment, parameters of the vehicle model may be determined based on the track data through system identification.

Further, parameters of thermal equations may be updated or identified. The thermal equations may be used to calculate the engine temperature, the electric motor temperature, and the brake temperature. The thermal equation of the engine temperature may be a function of vehicle velocity and the engine torque:

$$H_{ICE}(d)=f_5(V(d), T_{ICE}(d)). \quad \text{Equation 7}$$

The thermal equation of the electric motor temperature may be a function of vehicle speed, electric motor torque, and battery state of charge:

$$H_E(d)=f_6(V(d), T_e(d), F_{SOC}(d)). \quad \text{Equation 8}$$

The thermal equation of the brake temperature may be a function of vehicle speed and the braking torque:

$$H_B(d) = f_7(V(d), T_B(d)).$$                                Equation 9

At 408, an optimal torque arbitration levels are determined based on the updated vehicle model through optimization. In one embodiment, if an optimal velocity profile is known, the engine torque demand $u_1(d)$, the electric motor torque demand $u_2(d)$, and the brake torque demand $u_3(d)$ may be optimized such that the vehicle velocity profile approaches to the optimal vehicle profile. The optimization problem may be expressed as a first cost function:

$$\min_{(u_1,u_2,u_3)} \|V_r - fa\|$$                          Equation 10 s.t.

$$T_{emin}(V(d), F_{SOC}(d)) \leq T_e(d) \leq T_{emax}(V(d), F_{SOC}(d)),$$

$$0 \leq F_{SOC}(d) \leq 1,$$

$$0 \leq T_{ICE}(d) \leq T_{ICEmax}(V(d), F_{QTY}(d)),$$

$$0 \leq F_{QTY}(d) \leq 1,$$

$$T_{Bmin}(V(d)) \leq T_B(d) \leq 0,$$

$$H_{ICEmin} \leq H_{ICE}(d) \leq H_{ICE\,max},$$

$$H_{Emin} \leq H_E(d) \leq H_{Emax},$$

$$H_{Bmin} \leq H_B(d) \leq H_{Bmax},$$

wherein $V_r$ is the optimal velocity profile. The motor torque $T_e$ is limited by the maximum and minimum current electric motor torque, $T_{emax}$ and $T_{emin}$, wherein both the maximum and minimum current electric motor torque, $T_{emax}$ and $T_{emin}$, are functions of vehicle speed and battery state of charge. The engine torque is limited by the maximum engine torque available $T_{ICEmax}$, which is a function of vehicle speed $V(d)$ and the onboard fuel amount $F_{qty}(d)$. The braking torque may be limited by an available torque from the friction brake $T_{Bmin}$, which is a function of vehicle speed.

In another embodiment, if the optimal velocity profile is unknown, the engine torque demand $u_1(d)$, the electric motor torque demand $u_2(d)$, and the brake torque demand $u_3(d)$ may be optimized to minimize an average vehicle speed over the track. The optimization problem may be expressed as a second cost function:

$$\min_{(u_1,u_2,u_3)} \frac{1}{V_{avg}}, \text{ s.t. } T_{emin}(V(d),$$   Equation 11

$$F_{SOC}(d)) \leq T_e(d) \leq T_{emax}(V(d), F_{SOC}(d)),$$

$$0 \leq F_{SOC}(d) \leq 1, 0 \leq T_{ICE}(d) \leq T_{ICEmax}(V(d),$$

$$F_{QTY}(d)), 0 \leq F_{QTY}(d) \leq 1, T_{Bmin}(V(d)) \leq T_B(d) \leq 0,$$

$$H_{ICEmin} \leq H_{ICE}(d) \leq H_{ICEmax}, H_{Emin} \leq H_E(d) \leq H_{Emax},$$

$$H_{Bmin} \leq H_B(d) \leq H_{Bmax},$$

wherein $V_{avg}$ is the averaged speed.

The optimization problem may be solved with several available method. For example, if cost function is a convex case, gradient based methods may be used. If the cost function is a non-convex case, genetic and heuristic algorithms may be used.

The torque arbitration may be calculated based on the optimized engine torque demand $u_1'$ and the optimized electric motor torque demand $u_2'$:

$$\text{Engine torque level} = \frac{u_1'}{u_1' + u_2'} \times 100\%;$$   Equation 12

$$\text{Motor torque level} = \frac{u_2'}{u_1' + u_2'} \times 100\%.$$

Method 400 then operate the vehicle with the torque arbitration generated based on the optimization.

FIG. 5 illustrates example timelines of the engine torque level 510, electric motor level 520, battery state of charge 530, and the onboard fuel amount 540 while implementing method 400. The x-axes are time. The time increase as indicated by the arrows.

At $T_1$, the vehicle starts the race on a predetermined route. The controller may load the stored engine torque level and the motor torque level at each location on the route. Herein, the torque arbitration levels are constant throughout the race. That is, from $T_1$ till the vehicle finishes the race at $T_2$, the engine torque level remains the same, and the motor torque level remains the same. The battery state of charge and the onboard fuel amount continue decreasing from $T_1$ to $T_2$. The track data including the vehicle speed, engine torque output, electric motor output, onboard fuel amount are monitored and recorded.

At $T_2$, the vehicle finishes the race with a non-zero battery state of charge and a non-zero onboard fuel amount. The controller compares the race time from $T_1$ to $T_2$, and determines that optimization of torque arbitration is necessary to improve the race time. Thus, a vehicle model is updated based on the track data, and the torque arbitration is optimized based on the updated vehicle model.

At $T_3$, the vehicle starts a second race on the same route. The vehicle is operated based on the optimized torque arbitration. From $T_3$ till the vehicle finishes the second race at $T_4$. The engine torque level decreases and the motor torque level increases. The change rate of the battery state of charge is first slow, then increases at the end of the race. The change rate of the amount of onboard fuel is fast at the beginning of the second race due to the high engine torque level. The change rate of the amount of onboard fuel is then decreased approaching the end of the race. Both the battery state of charge and the onboard fuel amount are zero at the end of the race at $T_4$. Comparing to the first race, the onboard fuel is depleted faster so that the vehicle weight is reduced faster to increase the overall power to weight ratio in the race.

At $T_4$, the controller determines that the track time for the second race meets the requirement. The torque arbitration levels and the vehicle model are saved in the controller memory.

In this way, torque arbitration levels between the engine and the electric motor on a predetermined route is updated through an optimization process based on a vehicle model. The vehicle model is updated based on the actual track data after each run on the route. The vehicle model is a function of vehicle onboard fuel amount.

The technical effect of updating the vehicle model is that variations in the vehicle and the race conditions may be taken into account. The technical effect of optimizing the torque arbitration levels after each race is that the torque arbitration level may be adjusted at each location on the route to efficiently utilizing the onboard fuel and energy stored in the energy storage device. The technical effect of constructing the vehicle model based on the vehicle onboard fuel amount is that the optimization algorithm may achieve the highest averaged power to weight ratio. The technical effect of considering the thermal states of the vehicle during optimization is that thermal effects on the power electronics can be accounted for.

In an embodiment, a method comprises operating a hybrid powertrain to provide a torque to vehicle wheels over a predetermined route; and arbitrating the torque between an engine and an electric machine based on a vehicle mass. In a first example of the method, the method further comprises determining the vehicle mass based on an onboard fuel amount while operating the hybrid powertrain. A second example of the method optionally includes the first example and further includes determining the torque arbitration between the engine and the electric machine based on a vehicle model. A third example of the method optionally includes one or more of the first and second examples, and further includes measuring an engine torque output and an electric machine torque output while operating the hybrid powertrain, and identifying the vehicle model based on the measured engine torque output, the measured electric machine torque output, and the vehicle mass. A fourth example of the method optionally includes one or more of the first through third examples, and further includes, wherein the vehicle model is identified based further on a measured vehicle velocity, a measured onboard fuel amount, and a measured battery state of charge. A fifth example of the method optionally includes one or more of the first through fourth examples, and further includes determining the torque arbitration by minimizing a difference between an optimal velocity profile and a velocity profile calculated based on the identified vehicle model. A sixth example of the method optionally includes one or more of the first through fifth examples, and further includes determining the arbitration by maximizing an averaged vehicle speed calculated based on the identified vehicle model. A seventh example of the method optionally includes one or more of the first through sixth examples, and further includes wherein the torque is arbitrated such that an onboard fuel amount is zero at the end of the route. An eighth example of the method optionally includes one or more of the first through seventh examples, and further includes wherein the torque is arbitrated such that a battery state of charge is zero at the end of the route.

In another embodiment, a method comprises operating a vehicle with a torque arbitration between an engine and an electric machine over a predetermined route; measuring an onboard fuel amount; and updating the torque arbitration based on the measured onboard fuel amount to maximize an averaged power to weight ratio over the predetermined route. In a first example of the method, the method further comprises updating the torque arbitration based on a vehicle model, and updating parameters of the vehicle model based on the measured onboard fuel amount. A second example of the method optionally includes the first example and further includes measuring a track data during vehicle operation, and updating the parameters of the vehicle model based on the measured track data. A third example of the method optionally includes one or more of the first and second examples, and further includes wherein the track data includes an engine torque, an electric machine torque, a braking torque, a vehicle velocity and a battery state of charge. A fourth example of the method optionally includes one or more of the first through third examples, and further includes, wherein the torque arbitration is updated such that a vehicle profile calculated based on the updated torque arbitration approaches an optimal vehicle profile. A fifth example of the method optionally includes one or more of the first through fourth examples, and further includes wherein the torque arbitration is updated such that an average vehicle speed calculated based on the updated arbitration is maximum. A sixth example of the method optionally includes one or more of the first through fifth examples, and further includes updating the torque arbitration such that the onboard fuel amount is a first threshold value and a battery state of charge is a second threshold value at the end of the predetermined route.

In another embodiment, a hybrid vehicle, comprises: a wheel, an engine coupled to the wheel; an electric machine coupled to the wheel; a brake coupled to the wheel; and a controller configured with computer readable instructions stored on non-transitory memory for: loading a torque arbitration for a route; operating the vehicle on the route by distributing a torque demand between the engine and the electric machine based on the loaded torque arbitration; measuring an onboard fuel amount while operating the vehicle; optimizing the torque arbitration based on the on board fuel amount at the end of the route; and storing the optimized torque arbitration. In a first example of the method, the method further comprises configuring the controller for optimizing the torque arbitration based on a vehicle model. A second example of the method optionally includes the first example and further includes configuring the controller for updating the vehicle model based on the measured onboard fuel amount. A third example of the method optionally includes one or more of the first and second examples, and further includes configuring the controller to operating the vehicle on the route with a braking torque equals to a driver demanded braking torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
operating a hybrid powertrain to provide a torque to vehicle wheels over a predetermined route;
distributing the torque between an engine and an electric machine based on a torque arbitration;
updating the torque arbitration based on a vehicle mass including an onboard fuel amount; and
optimizing the torque arbitration to increase a change rate of the onboard fuel amount and a battery state of charge to maximize an averaged power to weight ratio in comparison to a previous operating of the vehicle over the predetermined route.

2. The method of claim 1, further comprising determining the torque arbitration between the engine and the electric machine based on a vehicle model comprised of functions.

3. The method of claim 2, further comprising measuring an engine torque output and an electric machine torque output while operating the hybrid powertrain, and determining the vehicle model based on the measured engine torque output, the measured electric machine torque output, and the vehicle mass.

4. The method of claim 3, wherein the vehicle model is determined based further on a measured vehicle velocity, a measured onboard fuel amount, and a measured battery state of charge.

5. The method of claim 4, further comprising optimizing the torque arbitration by minimizing a difference between an optimal velocity profile and a velocity profile calculated based on the determined vehicle model.

6. The method of claim 4, further comprising optimizing the torque arbitration by maximizing an averaged vehicle speed calculated based on the determined vehicle model.

7. A method comprising:
operating a vehicle over a predetermined route using a torque arbitration to distribute a load between an engine and an electric machine;
measuring an onboard fuel amount;
updating the torque arbitration based on a vehicle model comprised of functions, including the measured onboard fuel amount and a brake torque; and
optimizing the torque arbitration to increase a fuel change rate to minimize an averaged weight over the predetermined route in comparison to a previous operating of the vehicle over the predetermined route.

8. The method of claim 7, further comprising measuring an engine torque, an electric machine torque, a vehicle velocity, and a battery state of charge and including these measurements in the vehicle model.

9. The method of claim 8, further comprising calculating an optimal vehicle profile by optimizing at least an engine load and an electric machine load,
wherein the optimizing the torque arbitration includes minimizing a difference between a current vehicle profile and the optimal vehicle profile.

10. The method of claim 8, wherein the torque arbitration is further optimized to maximize an average vehicle speed.

11. The method of claim 7, further comprising updating the torque arbitration such that the onboard fuel amount is below a value of a previous operation and a battery state of charge is below a value of a previous operation at an end of the predetermined route.

12. A hybrid vehicle, comprising:
a wheel;
an engine coupled to the wheel;
an electric machine coupled to the wheel;
a brake coupled to the wheel; and
a controller configured with computer readable instructions stored on non-transitory memory for:
loading a torque arbitration for a route;
operating the vehicle on the route by distributing a torque demand between the engine and the electric machine based on the loaded torque arbitration;
measuring an onboard fuel amount while operating the vehicle;
optimizing the torque arbitration based on the onboard fuel amount at an end of the route to increase a fuel change rate in comparison to a previous operating of the vehicle; and
storing the optimized torque arbitration.

13. The hybrid vehicle of claim 12, wherein optimizing the torque arbitration includes increasing the change rate of the onboard fuel amount and a battery state of charge to maximize an averaged power to weight ratio.

14. The hybrid vehicle of claim 12, wherein optimizing the torque arbitration further comprises optimizing a braking torque based on an optimal velocity profile.

15. The method of claim 1, further including optimizing the torque arbitration to increase the change rate of the onboard fuel amount to maximize the averaged power to weight ratio.

16. The method of claim 15, further including optimizing the torque arbitration based on an engine temperature limit and an electric machine temperature limit.

17. The method of claim 8, further including measuring vehicle thermal states and determining a vehicle position on the predetermined route and including the measurement and the position in the vehicle model.

18. The method of claim of claim 9, wherein an engine torque demand, an electric motor torque demand, and a brake torque demand are optimized based on the vehicle model.

19. The hybrid vehicle of claim 12, wherein optimizing the torque arbitration further includes increasing the change rate of an onboard fuel weight over the route to maximize an averaged power to weight ratio.

20. The hybrid vehicle of claim 19, wherein optimizing the torque arbitration is further based on a vehicle speed, a battery state of charge, an engine temperature, an electric machine temperature, and a position on the route.

* * * * *